US012646212B2

(12) United States Patent
Troccoli et al.

(10) Patent No.: US 12,646,212 B2
(45) Date of Patent: Jun. 2, 2026

(54) SELECTING CAMERA TO PRESENT IMAGE FOR CALIBRATION

(71) Applicant: GOOGLE LLC, Mountain View, CA (US)

(72) Inventors: Alejandro Jose Troccoli, San Jose, CA (US); Alexander William Hake, Seattle, WA (US); Vineet Bhatawadekar, Seattle, WA (US)

(73) Assignee: Google LLC, Mountain View, CA (US)

( * ) Notice: Subject to any disclaimer, the term of this patent is extended or adjusted under 35 U.S.C. 154(b) by 238 days.

(21) Appl. No.: 18/543,895

(22) Filed: Dec. 18, 2023

(65) Prior Publication Data

US 2025/0200804 A1    Jun. 19, 2025

(51) Int. Cl.
| | |
|---|---|
| *G06T 7/80* | (2017.01) |
| *H04N 23/58* | (2023.01) |
| *H04N 23/60* | (2023.01) |
| *H04N 23/62* | (2023.01) |
| *H04N 23/90* | (2023.01) |

(52) U.S. Cl.
CPC .............. *G06T 7/80* (2017.01); *H04N 23/58* (2023.01); *H04N 23/62* (2023.01); *H04N 23/64* (2023.01); *H04N 23/90* (2023.01); *G06T 2207/20104* (2013.01)

(58) Field of Classification Search
CPC . G06T 7/80; G06T 2207/20104; H04N 23/58; H04N 23/62; H04N 23/64; H04N 23/90; H04N 17/002
See application file for complete search history.

(56) References Cited

U.S. PATENT DOCUMENTS

| | | |
|---|---|---|
| 2014/0232879 A1 | 8/2014 | Gottwals et al. |
| 2015/0130951 A1 | 5/2015 | Olson et al. |
| 2021/0049409 A1* | 2/2021 | Klein ..................... G06V 20/52 |
| 2021/0092354 A1 | 3/2021 | Shivalingappa et al. |
| 2021/0329221 A1 | 10/2021 | Arbabian et al. |
| 2022/0148225 A1 | 5/2022 | Myokan |

(Continued)

OTHER PUBLICATIONS

Huai, et al., "A Review and Comparative Study of Close-Range Geometric Camera Calibration Tools", arXiv:2306.09014v1, Jun. 15, 2023, 17 pages.

(Continued)

*Primary Examiner* — Christopher K Peterson

(57) ABSTRACT

A method of calibrating multiple cameras includes determining a first position of an overlay within a first field of view of a first camera and a second position of the overlay within a second field of view of a second camera; selecting, from the first camera and the second camera based on the first position and the second position, the first camera as a presentation camera; presenting, on a display, an image of a calibration object captured by the presentation camera and the overlay, the overlay indicating a calibration position for the calibration object with respect to the presentation camera; capturing a first calibration image of the calibration object by the first camera and a second calibration image of the calibration object by the second camera; and calibrating the first camera based on the first calibration image and calibrating the second camera based on the second calibration image.

20 Claims, 8 Drawing Sheets

(56) References Cited

U.S. PATENT DOCUMENTS

2022/0217301 A1 * 7/2022 Ballard ............... H04N 13/271

OTHER PUBLICATIONS

Peng, et al., "CalibrationWizard: A Guidance System for Camera Calibration Based on Modelling Geometric and Corner Uncertainty", arXiv:1811.03264v2 (https://doi.org/10.48550/arXiv.1811.03264), Sep. 3, 2019, 14 pages.

* cited by examiner

Image
200

Overlay
202

Image
250

Overlay
252

Representation
302

Overlay
350

Display
102

Representation
402

Overlap
406

Overlay
404

Union
450

700

Capture initial images
702

Select presentation camera
704

Present image and overlay
706

Capture calibration images
708

Calibrate cameras
710

SELECTING CAMERA TO PRESENT IMAGE FOR CALIBRATION

TECHNICAL FIELD

This description relates to calibrating cameras.

BACKGROUND

Cameras can be calibrated for applications in computer vision and photogrammetry. Accuracy of the calibration can depend on poses used to acquire images for the calibration.

SUMMARY

Multiple cameras are calibrated by presenting a calibration object to the cameras. A user is guided in placing the calibration object in position by an overlay that is presented on a display that presents a feed including images captured by one of the cameras being calibrated. One of the cameras is selected to present the feed. The camera is selected based on one or more features of the overlay with respect to a field of view of the camera.

According to an example, a method of calibrating multiple cameras includes determining a first position of an overlay within a first field of view of a first camera and a second position of the overlay within a second field of view of a second camera; selecting, from the first camera and the second camera based on the first position and the second position, the first camera as a presentation camera; presenting, on a display, an image of a calibration object captured by the presentation camera and the overlay, the overlay indicating a calibration position for the calibration object with respect to the presentation camera; capturing a first calibration image of the calibration object by the first camera and a second calibration image of the calibration object by the second camera; and calibrating the first camera based on the first calibration image and calibrating the second camera based on the second calibration image.

According to an example, a non-transitory computer-readable storage medium comprises instructions stored thereon for calibrating multiple cameras. The instructions, when executed by at least one processor, are configured to cause a computing device to determining a first position of an overlay within a first field of view of a first camera and a second position of the overlay within a second field of view of a second camera; select, from the first camera and the second camera based on the first position and the second position, the first camera as a presentation camera; present, on a display, an image of a calibration object captured by the presentation camera and the overlay, the overlay indicating a calibration position for the calibration object with respect to the presentation camera; capture a first calibration image of the calibration object by the first camera and a second calibration image of the calibration object by the second camera; and calibrate the first camera based on the first calibration image and calibrating the second camera based on the second calibration image.

According to an example, a computing device comprises at least one processor and a non-transitory computer-readable storage device comprising instructions stored thereon for calibrating multiple cameras. The instructions, when executed by the at least one processor, are configured to cause the computing device to determine a first position of an overlay within a first field of view of a first camera and a second position of the overlay within a second field of view of a second camera; select, from the first camera and the second camera based on the first position and the second position, the first camera as a presentation camera; present, on a display, an image of a calibration object captured by the presentation camera and the overlay, the overlay indicating a calibration position for the calibration object with respect to the presentation camera; capture a first calibration image of the calibration object by the first camera and a second calibration image of the calibration object by the second camera; and calibrate the first camera based on the first calibration image and calibrating the second camera based on the second calibration image.

The details of one or more implementations are set forth in the accompanying drawings and the description below. Other features will be apparent from the description and drawings, and from the claims.

BRIEF DESCRIPTION OF THE DRAWINGS

Like reference numbers refer to like elements.

DETAILED DESCRIPTION

Cameras can be calibrated for applications such as computer vision and photogrammetry. During calibration, a user can be guided to place a calibration object in specific positions, which can be considered calibration positions, enabling the cameras to capture the calibration object at various angles. The user can be guided by presentation of a camera feed that includes images of the calibration object captured by a camera, along with an overlay indicating where the user should place or hold the calibration object.

A computing system can include multiple cameras for capturing images from multiple positions. The capturing of images from multiple positions can facilitate generation of a representation of an object from an angle that is different than any angle from which images of the object were actually captured. A technical problem with calibrating multiple cameras is that a feed and/or field of view of a given camera may be suboptimal for guiding the user in placement of the calibration object.

A technical solution to the technical problem of the feed and/or field of view of a given camera being suboptimal is selecting a camera for presentation of the feed based on how valuable the field of view of the camera will be to assist the user in placement of the calibration object. The camera can be selected based, for example, on a predetermined portion of the overlay being within a field of view of the camera, based on a distance of a predetermined portion of the overlay from a center of the field of view, based on a number of corners of the overlay being within the field of view of the camera, based on an angle between a plane extending through the overlay and/or calibration position and a line between the camera and the overlay and/or calibration position, based on a distance between the camera (or the display) and the overlay and/or calibration position, or based on the camera having been previously selected to present the feed. A technical benefit of selecting the camera for presentation of the feed based on how valuable the field of view and/or feed captured by the camera will be is presenting a feed to a user that is helpful in locating the calibration object is quickly capturing images of the calibration object in locations that are beneficial in calibrating the cameras.

Figure 1:
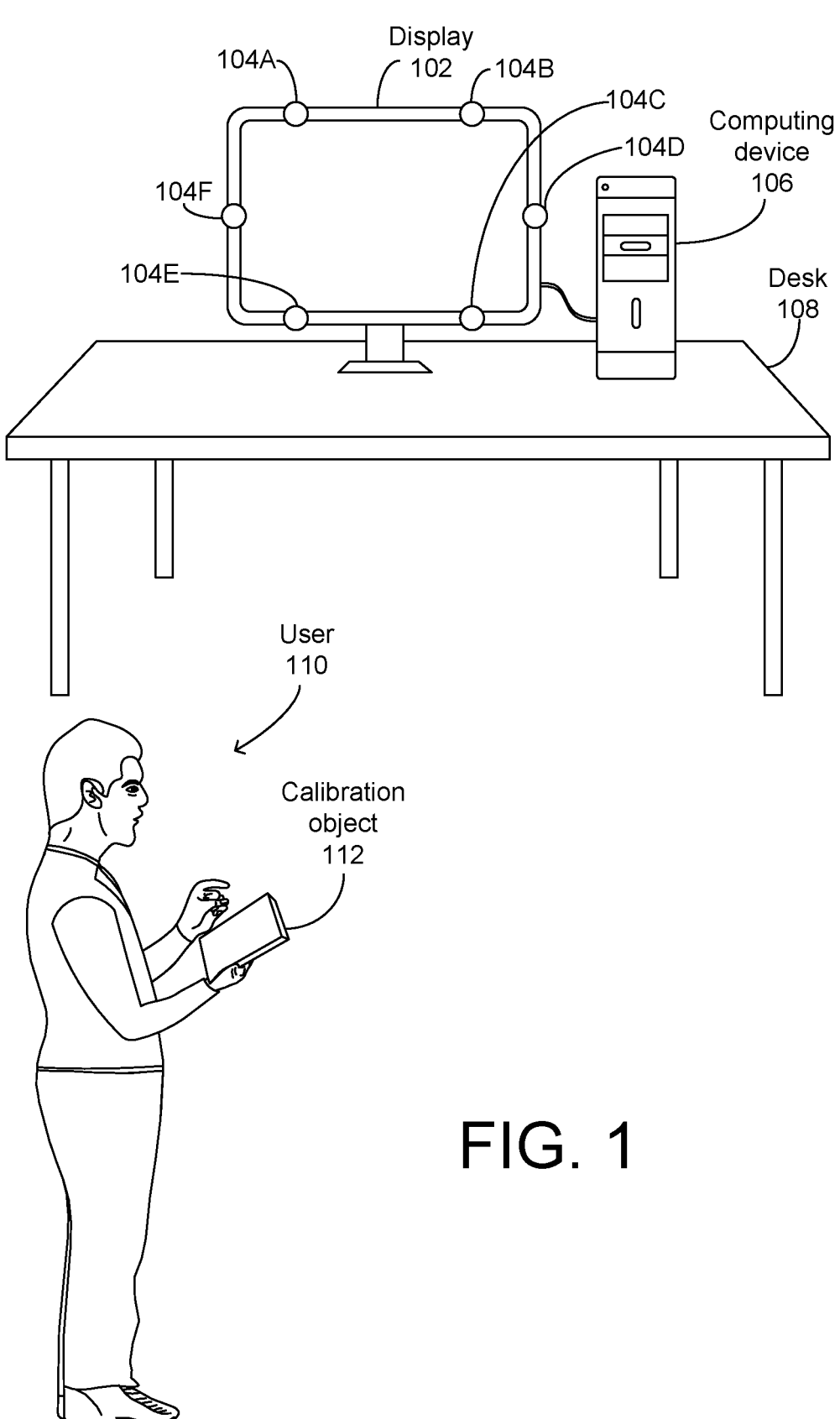
FIG. 1 is a perspective view of a user holding a calibration object in front of multiple cameras.

FIG. 1 is a perspective view of a user 110 holding a calibration object 112 in front of multiple cameras 104A, 104B, 104C, 104D, 104E, 104F. The user 110 is holding the calibration object 112 as part of a process of calibrating the cameras 104A, 104B, 104C, 104D, 104E, 104F. The user 110 holds the calibration object 112 in multiple predetermined calibration positions while the cameras 104A, 104B, 104C, 104D, 104E, 104F capture images of the calibration object 112 in the predetermined calibration positions. The calibration object 112 can include a planar object, such as a piece of cardboard, with a predetermined pattern, such as a checkerboard, printed or otherwise displayed on one or both sides of the calibration object 112.

A computing device 106, or any computing device in communication with the cameras 104A, 104B, 104C, 104D, 104E, 104F, calibrates the cameras 104A, 104B, 104C, 104D, 104E, 104F based on the captured images. The cameras 104A, 104B, 104C, 104D, 104E, 104F are arranged in fixed positions with respect to each other, such as being disposed in various locations on a display 102. The display 102 and computing device 106 can rest on a desk 108 or other supportive structure. While six cameras 104A, 104B, 104C, 104D, 104E, 104F are shown in FIG. 1, any number of two or more cameras can be calibrated according to this description.

Figure 3:
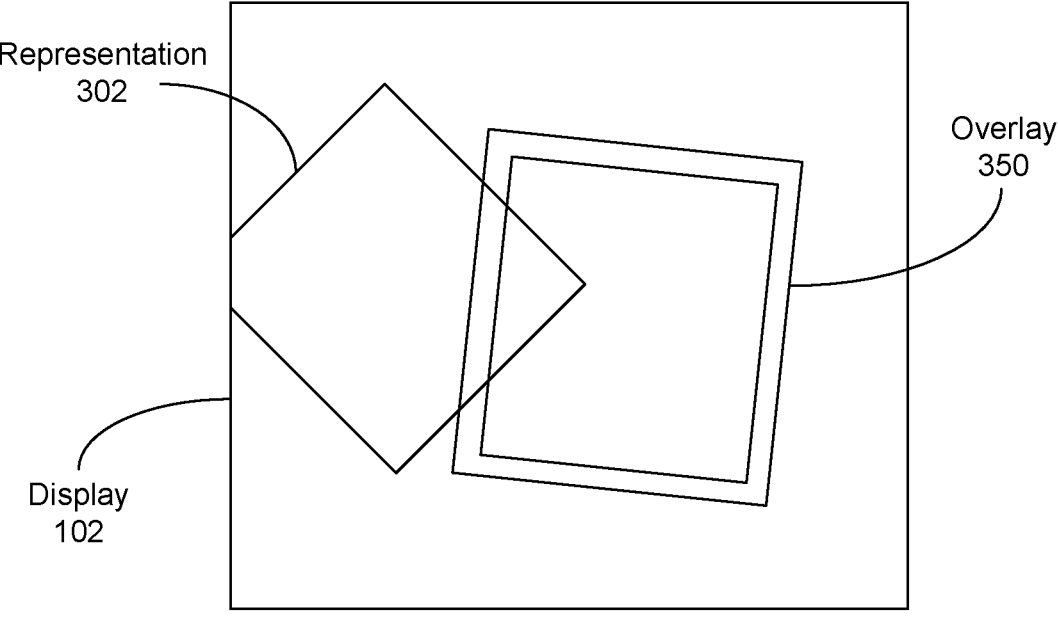
FIG. 3 shows a display with a representation of the calibration object and an overlay indicating a calibration position for the calibration object.
Figure 4A:
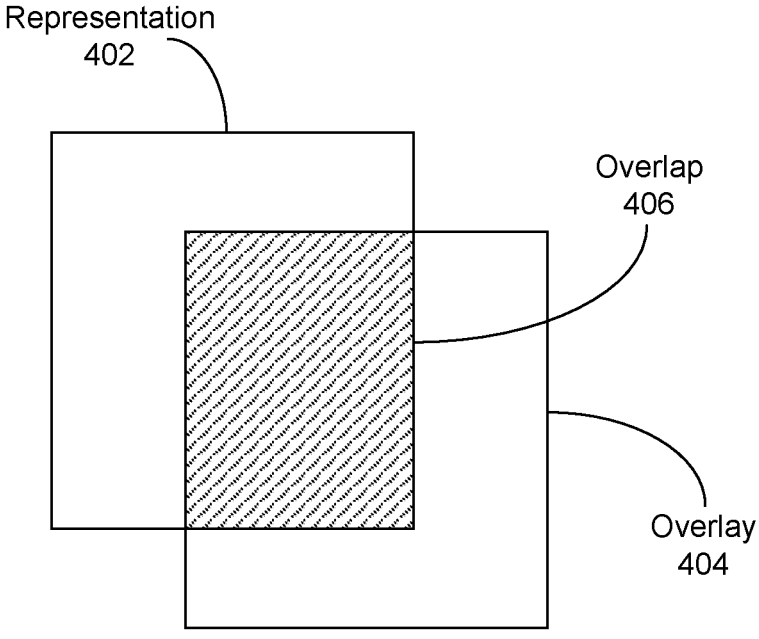
FIG. 4A shows an overlap between a representation of the calibration object and the overlay.

A computing device, such as the computing device 106, can guide the user to place and/or orient the calibration object 112 in multiple predetermined calibration positions that can be captured by the cameras 104A, 104B, 104C, 104D, 104E, 104F. The display 102 can present a graphical indication indicating a calibration position where the user 110 should place and/or orient the calibration object 112. An overlay, shown in FIGS. 3 and 4A, is an example of a graphical indication indicating the calibration position where the user 110 should place and/or orient the calibration object 112. The display 102 can present the graphical indication in conjunction with a camera feed showing representations of the calibration object 112 that were captured by one or more of the cameras 104A, 104B, 104C, 104D, 104E, 104F. Different locations and/or orientations of the cameras 104A, 104B, 104C, 104D, 104E, 104F and associated fields of view can cause the images and/or representations of the calibration object 112 captured by the cameras 104A, 104B, 104C, 104D, 104E, 104F and included in feeds of the respective cameras 104A, 104B, 104C, 104D, 104E, 104F to look different, with some being more or less helpful for the user 110 to place and/or orient the calibration object 112 in a predetermined position.

The cameras 104A, 104B, 104C, 104D, 104E, 104F can capture images of the calibration object 112. The computing device in communication with the cameras 104A, 104B, 104C, 104D, 104E, 104F and the display 102, such as the computing device 106, can select one of the cameras 104A, 104B, 104C, 104D, 104E, 104F based on fields of view of the cameras 104A, 104B, 104C, 104D, 104E, 104F and predetermined calibration positions where an overlay will be presented. The computing device can select the camera 104A, 104B, 104C, 104D, 104E, 104F that has a field of view that would be most helpful for the user 110 to place and/or orient the calibration object 112.

Figure 2A:
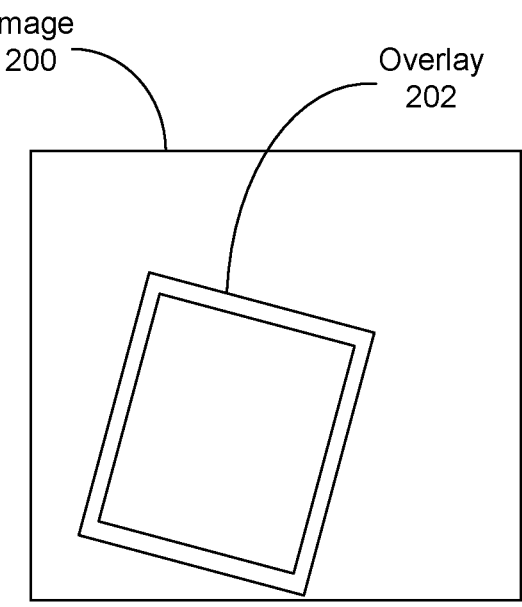
FIG. 2A shows a first field of view and an overlay.

FIG. 2A shows a first field of view 200 and an overlay 202. The first field of view 200 is a field of view of a first camera. The first camera is one of the cameras 104A, 104B, 104C, 104D, 104E, 104F. The overlay 202 can be presented within the field of view 200 if the first camera is selected as the presentation camera. The computing device determines the first field of view 200 associated with the first camera during a process of calibrating the cameras 104A, 104B, 104C, 104D, 104E, 104F.

The computing device can determine a position of an overlay 202 within the first field of view 200. The position of the overlay 202 will be based on the calibration position with respect to the first field of view 200. The first field of view 200 includes the overlay 202 based on the respective positions of the first camera and the calibration position and the field of view 200 of the first camera.

A computing device in communication with the first camera, such as the computing device 106, can determine features and/or properties of the first field of view 200 with respect to the overlay 202 based on which the computing device will determine whether to present the feed of images captured by the first camera on the display 102. In some examples, the computing device determines whether a predetermined portion of the overlay 202, such as a middle portion or center portion of the overlay 202, is within the field of view 200 of the first camera based on respective positions of the first camera and the calibration position and specifications of the first camera (such as a specified angle of view of the first camera). In the example shown in FIG. 2A, all portions of the overlay 202 are included in and/or within the first field of view 200. In some examples, the computing device determines a distance of the predetermined portion of the overlay 202 from a predetermined portion (such as the center) of the first field of view 200. In some examples, the computing device determines a number of visible corners of the overlay 202 that are within the first field of view 200. In the example shown in FIG. 2A, all four corners of the overlay 202 are within the first field of view 200. In some examples, the computing device determines an angle of the calibration position and/or overlay 202 with respect to the first camera based on the respective positions of the first camera and calibration position and/or overlay 202. In some examples, the computing device determines an angle of the overlay and/or calibration position with respect to the first camera based on triangulation and respective positions of the cameras 104A, 104B, 104C, 104D, 104E, 104F. In some examples, the computing device determines a distance of the calibration position and/or overlay 202 from the first camera. In some examples, the computing device determines a distance of the calibration position and/or overlay 202 from the first camera (or the display 102) based on triangulation and respective positions of the cameras 104A, 104B, 104C, 104D, 104E, 104F.

Figure 2B:
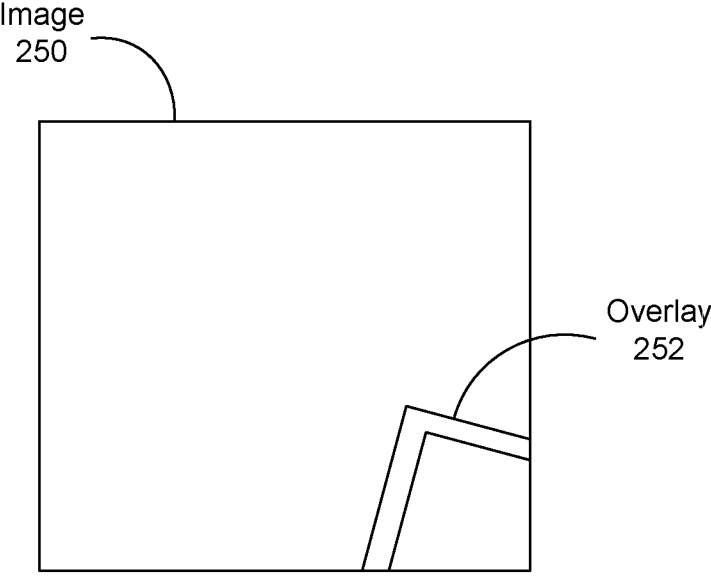
FIG. 2B shows a second field of view and an overlay.

FIG. 2B shows a second field of view 250 and an overlay 252. The second field of view 250 can be associated with a second camera. The overlay 252 can be included in a feed of the second camera if the second camera is selected as the presentation camera. The second camera is one of the cameras 104A, 104B, 104C, 104D, 104E, 104F that is different from the first camera. The overlay 252 can have similar features with respect to the second field of view 250 and second camera as the overlay 202 has with respect to the first field of view 200 and the first camera.

The computing device can determine a position of an overlay 252 within the second field of view 250. The position of the overlay 252 will be based on the calibration position with respect to the second field of view 250 (the calibration position based on which the position of the overlay 252 is determined is the same calibration position based on which the position of the overlay 202 was determined). The second field of view 250 includes the overlay 202 based on the respective positions of the second camera and the calibration position and the field of view 250 of the second camera.

A computing device in communication with the second camera, such as the computing device 106, can determine features and/or properties of the second field of view 250 with respect to the overlay 252 in a similar manner as discussed above with respect to the first field of view 200 and the overlay 202.

The computing device can determine features and/or properties of fields of view of the cameras 104A, 104B, 104C, 104D, 104E, 104F with respect to the calibration position and/or overlays as discussed above regarding the first camera and second camera with respect to FIGS. 2A and 2B. The computing device can select one of the cameras as a presentation camera based at least in part on the determined features and/or properties of the fields of view each of the cameras 104A, 104B, 104C, 104D, 104E, 104F with respect to the calibration position and/or overlay. In some examples, the computing device selects one of the cameras 104A, 104B, 104C, 104D, 104E, 104F as the presentation camera based on the predetermined portion of the overlay 202, 252 being closest to a predetermined portion of the field of view 200, 250. In some examples, the computing device selects one of the cameras 104A, 104B, 104C, 104D, 104E, 104F as the presentation camera based on the overlay 202, 252 and/or calibration position being closer to a center of the field of view 200, 250 than overlays and/or calibration positions with respect to fields of view of the other cameras 104A, 104B, 104C, 104D, 104E, 104F. In some examples, the computing device selects one of the cameras 104A, 104B, 104C, 104D, 104E, 104F as the presentation camera based on a number of corners of the overlay 202, 252 within the field of view 200, 250 of the selected camera being greater than (or no less than) number of corners of the overlay 202, 252 within the fields of view 200, 250 of the other cameras 104A, 104B, 104C, 104D, 104E, 104F. In some examples, the computing device selects one of the cameras 104A, 104B, 104C, 104D, 104E, 104F as the presentation camera based on an angle between a plane extending through the calibration position and/or overlay 202, 252 and a line between the selected camera and the calibration position and/or overlay 202, 252 being closer to perpendicular than angles between the plane extending through the calibration position and/or overlay 202, 252 and lines between other cameras 104A, 104B, 104C, 104D, 104E, 104F and the calibration position and/or overlay 202, 252. In some examples, the computing device selects one of the cameras 104A, 104B, 104C, 104D, 104E, 104F as the presentation camera based on a distance between the selected camera (or display 102) and the calibration position (based upon which the overlay 202, 252 is generated) being greater than distances between the other cameras 104A, 104B, 104C, 104D, 104E, 104F and the calibration position. In some examples, the computing device selects one of the cameras 104A, 104B, 104C, 104D, 104E, 104F as the presentation camera based on the selected camera having been previously selected as the presentation camera, the selected camera currently being the presentation camera, and/or based on the display currently presenting a feed from the selected camera, maintaining continuity of presentation for the user 110.

After the computing device has selected the camera as the presentation camera, the display 102 can present a feed based on images captured by the selected presentation camera. The feed can show a representation of the calibration object 112. The display 102 can also display, in addition to the representation of the calibration object 112, an overlay. The overlay can guide the user 110 in placing and/or orienting the calibration object 112 to a predetermined position for calibrating the cameras 104A, 104B, 104C, 104D, 104E, 104F. The overlay can have a shape corresponding to and/or based on a shape of the calibration object 112 and/or a shape of a perimeter of the calibration object 112. The user 110 can move the calibration object 112 until the representation of the calibration object 112 is aligned with the overlay.

FIG. 3 shows the display 102 with a representation 302 of the calibration object 112 (not shown in FIG. 3) and an overlay 350 indicating a calibration position for the calibration object 112. The representation 302 can be included in an image captured by the camera selected as the presentation camera. The representation 302 can be a representation of the calibration object 112. The overlay 350 can have similar features as the overlays 202, 252 discussed above. The user 110 may be captured by the presentation camera holding the calibration object 112, but is not shown in FIG. 3 for clarity of illustration.

The display 102 can include and/or present the overlay 350. The overlay 350 guides the user 110 in placing and/or orienting the calibration object 112. The computing device can instruct the display 102 to add the overlay 350 to a predetermined location (which is based on the calibration position) with respect to the representation 302. The user 110, while looking at the display 102, moves the calibration object 112 to cause the representation 302 to align with the overlay 350. When the representation 302 is aligned with the overlay 350 the calibration object 112 is in the correct position. With the calibration object 112 in the correct position (the calibration position), the cameras 104A, 104B, 104C, 104D, 104E, 104F (not shown in FIG. 3) capture images of the calibration object 112. The images that the cameras 104A, 104B, 104C, 104D, 104E, 104F capture of the calibration object 112 while the calibration object 112 is in the calibration position can be considered calibration images. The computing device can calibrate the cameras 104A, 104B, 104C, 104D, 104E, 104F based on the calibration images.

The computing device can calibrate the cameras 104A, 104B, 104C, 104D, 104E, 104F based on multiple calibration images that the cameras 104A, 104B, 104C, 104D, 104E, 104F capture while the calibration object 112 is in different locations. The computing device and display 102 can guide the user 110 to place and/or orient the calibration object 112 into multiple predetermined calibration positions according to a predetermined sequence of calibration positions. The cameras 104A, 104B, 104C, 104D, 104E, 104F can capture calibration images of the calibration object 112 in the multiple different predetermined calibration positions. The computing device can calibrate the cameras 104A, 104B, 104C, 104D, 104E, 104F based on the calibration images that the cameras 104A, 104B, 104C, 104D, 104E, 104F captured in the multiple different predetermined calibration positions.

In some examples, the computing device can determine that the calibration object 112 is in the predetermined calibration position based on an overlap between the representation of the calibration object 112 and the overlay. In some examples, the computing device can determine that the calibration object 112 is in the predetermined calibration position based on an area of overlap satisfying a threshold proportion of an area of union between the representation of the calibration object 112 and the overlay.

FIG. 4A shows an overlap 406 between a representation 402 of the calibration object 112 (not shown in FIG. 4A) and the overlay 404. The representation 402 of the calibration object is included in an image captured by one of the cameras 104A, 104B, 104C, 104D, 104E, 104F. The representation 402 can be included in a feed of one of the cameras 104A, 104B, 104C, 104D, 104E, 104F. The overlay 404 can have features of the overlay 350 described above. The overlap 406 represents an area in the calibration image presented by the display 102 to the user 110 that is occupied by both the representation 402 and the overlay 404. The overlap 406 can be measured in pixels of the camera, pixels on the display 102, or by units of measurement such as square inches or square centimeters in physical space.

Figure 4B:
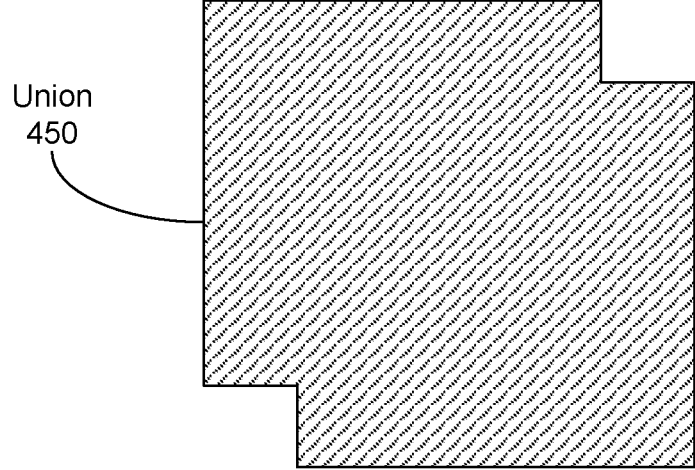
FIG. 4B shows a union between the representation of the calibration object and the overlay.

FIG. 4B shows a union 450 between the representation 402 (not labeled in FIG. 4B) of the calibration object 112 (not shown in FIG. 4B) and the overlay 404 (not labeled in FIG. 4B). The union 450 can represent an area in the calibration image presented by the display 102 that is occupied by at least one of the representation 402 and the overlay 404. The overlap 406 can be measured in pixels of the camera, pixels on the display 102, or by units of measurement such as square inches or square centimeters in physical space.

The computing device can determine a proportion of overlap by dividing the area of the overlap 406 by the area of the union 450. The computing device can determine that an overlap threshold is satisfied based on the proportion of overlap meeting or exceeding an overlap threshold. The computing device can calibrate the cameras 104A, 104B, 104C, 104D, 104E, 104F based on images that the cameras 104A, 104B, 104C, 104D, 104E, 104F capture while the overlap threshold is satisfied. The computing device can determine that the calibration object 112 is in the calibration position based on satisfaction of the overlap threshold.

Figure 5A:
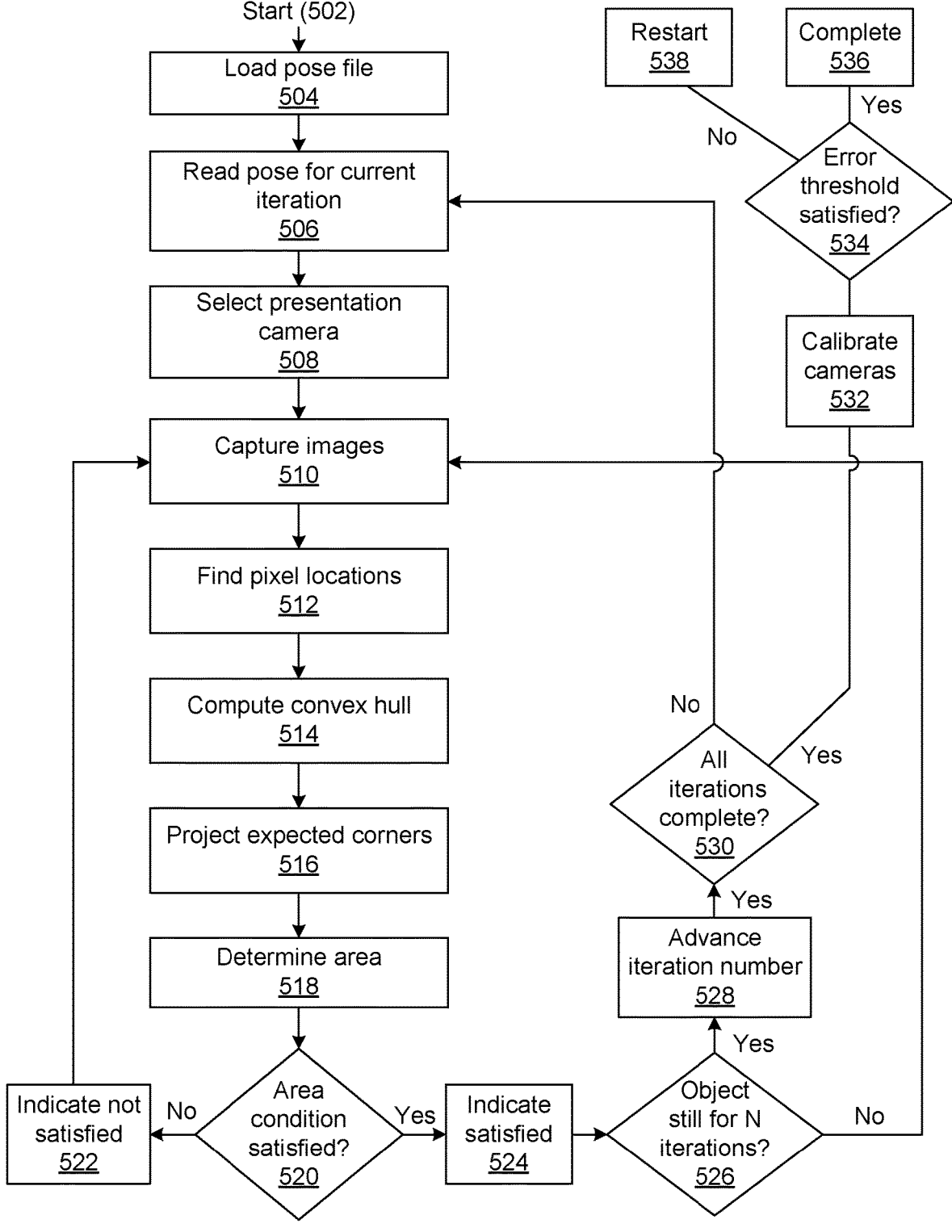
FIGS. 5A and 5B show a method of calibrating cameras.
Figure 5B:
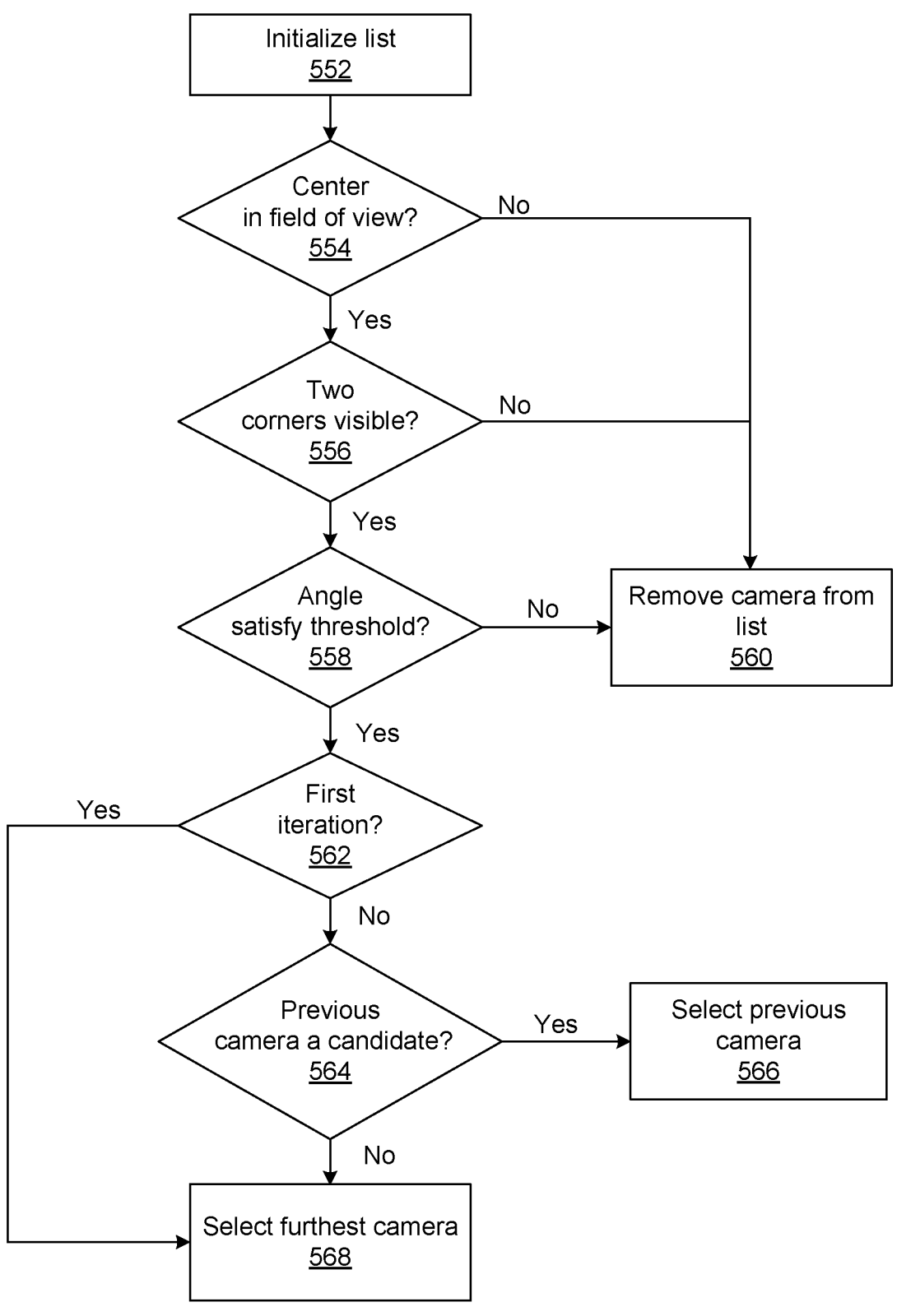

FIGS. 5A and 5B show a method of calibrating cameras. After starting (502) the method of calibrating cameras, the method includes loading a pose file (504). Loading a pose file (504) can include loading a file that includes predetermined poses and/or positions for the calibration object 112. The predetermined poses and/or positions can be calibration positions.

After loading the pose file (504), the method includes reading a pose and/or position for a current iteration (506). The current iteration includes capturing calibration images of the calibration object 112 by each of the cameras 104A, 104B, 104C, 104D, 104E, 104F. Reading the pose and/or position for the current iteration (506) includes determining a predetermined pose and/or position of the calibration object 112 for the current iteration of capturing calibration images.

After reading the pose and/or position for the current iteration (506), the method includes selecting a presentation camera (508). Selecting the presentation camera includes selecting the camera for which the feed will be presented on the display 102. A method of selecting a presentation camera (508) is shown in FIG. 5B.

A presentation camera can be selected (508) from among the cameras 104A, 104B, 104C, 104D, 104E, 104F that has a predetermined portion (such as a center portion) of an overlay and/or the calibration position within a field of view of the camera, has at least two corners visible in the field of view, and/or has an angle with respect to the presentation camera and/or display 102 that satisfies an angle threshold.

The selection of the presentation camera (508) includes initializing a candidate list (552) to include all the cameras 104A, 104B, 104C, 104D, 104E, 104F to be calibrated. The candidate list can include cameras identified in a file or cameras identified in response to a query to the computing system and/or display 102.

After initializing the candidate list (552) selecting the presentation camera (508) can include determining, for each camera, whether a predetermined portion of the overlay and/or calibration position such as the center of the overlay and/or calibration object is in the field of view of the camera (554), determining whether a predetermined number such as at least two corners of the overlay and/or calibration position are in the field of view of the camera (556), and whether an angle between the overlay and/or calibration position and the camera satisfies a threshold (558). The determination of the location of the overlay within the field of view can include applying a preexisting coarse reference calibration to the cameras. The calibrations of the respective cameras are refined and/or improved as by the process described herein.

The computing device can determine if a predetermined portion of the overlay and/or calibration position is within the field of view of the camera (554). If the predetermined portion of the overlay and/or calibration position is not within the field of view of the camera, then the camera can be removed from the list (560) of candidate cameras to be the presentation camera. If the predetermined portion of the overlay and/or calibration position is within the field of view of the camera, then the computing device can determine whether at least a threshold number such as two corners of the overlay and/or calibration position are visible (445) and/or within the field of view of the camera. If at least the predetermined number of corners are not visible, then the computing device can remove the camera from the list (560) of candidate cameras to be the presentation camera. If at least the predetermined number of corners are visible, then the computing device can determine whether the angle between the overlay and/or calibration position and the camera satisfies a threshold (558). The angle between the overlay and/or calibration position and the camera can be an angle between a plane extending through the overlay and/or calibration position and a line extending from the camera to the overlay and/or calibration position, or an angle between an optical axis of the camera and a normal of the overlay and/or calibration position. The threshold can be satisfied when, for example, the angle is less than or equal to a predetermined value such as sixty degrees (60°). If the angle does not satisfy the threshold, then the computing device can remove the camera from the list (560) of candidate cameras to be the presentation camera.

If the angle does satisfy the threshold, then the computing device can determine whether the current iteration is the first iteration (562), and/or whether the current position and/or pose for the calibration object 112 is the first position and/or pose in the sequence of poses. If the current iteration is the first iteration, then the computing device can select, as the presentation camera, the camera within the list that is furthest from the overlay and/or calibration position (568). If the current iteration is not the first iteration, then the computing device can determine whether the previous camera, which was and/or is currently the presentation camera for the previous iteration, is still in the candidate list (564), i.e. has not been removed at (560). If the previous camera is not still in the candidate list, then the computing device will select, as the presentation camera, the camera within the list that is furthest from the overlay and/or calibration position (568). If the previous camera is still in the list, then the computing device will select the previous camera (566) as the presentation camera.

Returning to FIG. 5A, after selecting the presentation camera (508), the method includes capturing images (510). Capturing images (510) includes capturing a set of images from each of the cameras 104A, 104B, 104C, 104D, 104E, 104F that are being calibrated.

After capturing images (510), the method includes finding pixel locations (512). Finding pixel locations (512) can include running pixel-processing algorithms to find pixel locations of predetermined locations of the calibration object 112 in the images for respective cameras.

After finding pixel locations (512), the method can include computing a convex hull (514). Computing the convex hull (514) can include computing a convex hull of the pixels that were found at (512).

After computing a convex hull (514), the method can include projecting expected corners (516). Projecting expected corners (516) can include projecting the expected corners of the predetermined position and/or angle of the calibration object 112 into the camera for which the image was captured.

After projecting the expected corners (516), the method can include determining an area (518). Determining the area (518) can include determining the overlap and/or intersection of the representation of the calibration object 112 in the image with the overlay, as discussed above with respect to FIG. 4A.

After determining the area (518), the method can include determining whether an area condition is satisfied (520). Determining whether the area condition is satisfied (520) can include determining whether an area of overlap satisfies a threshold proportion of an area of union between the representation of the calibration object 112 and the overlay, and/or whether an overlap threshold is satisfied, as discussed above with respect to FIGS. 4A and 4B.

If the area condition is not satisfied, then the computing device can cause the display 102 to present an indication that the area condition is not satisfied (522), such as by presenting the overlay in a particular color(s) such as red, and continue capturing images (510).

If the area condition is satisfied, then the computing device can cause the display 102 to present an indication that the area condition is satisfied (524), such as by presenting the overlay in a particular color(s) such as green.

After presenting the indication that the area condition is satisfied (524), the method can include determining whether the calibration object 112 has remained still for a predetermined number (N) of iterations (526). If the calibration object 112 has not remained still for the predetermined number of iterations, then the method can continue capturing images (510).

If the calibration object 112 has remained still for the predetermined number of iterations, then the computing device can advance an iteration number (528) and add the set of captured images to an algorithm processing queue. After adding the set of captured images to the algorithm processing queue, the method can include determining whether all iterations are complete (530), i.e. the cameras 104A, 104B, 104C, 104D, 104E, 104F have captured images of the calibration object 112 in all of the predetermined positions and/or orientations. If the iterations are not complete, then the method can include reading the pose, such as the predetermined position of the calibration object 112, for a current and/or next iteration (506).

If the iterations are complete, then the method can include calibrating the cameras 104A, 104B, 104C, 104D, 104E, 104F (532). Calibrating the cameras 104A, 104B, 104C, 104D, 104E, 104F (532) can include running calibration algorithms on images in the processing queue.

After calibrating the cameras 104A, 104B, 104C, 104D, 104E, 104F, the method can include determining whether an error threshold is satisfied (534). Determining whether the error threshold is satisfied (534) can include determining whether a reprojection error for the cameras 104A, 104B, 104C, 104D, 104E, 104F is less than or equal to the error threshold. If the error threshold is not satisfied, then the computing device can restart (538) the method of calibrating cameras. If the error threshold is satisfied, then the method is complete (536), and the computing device can proceed to performing camera-to-display calibration.

Figure 6:
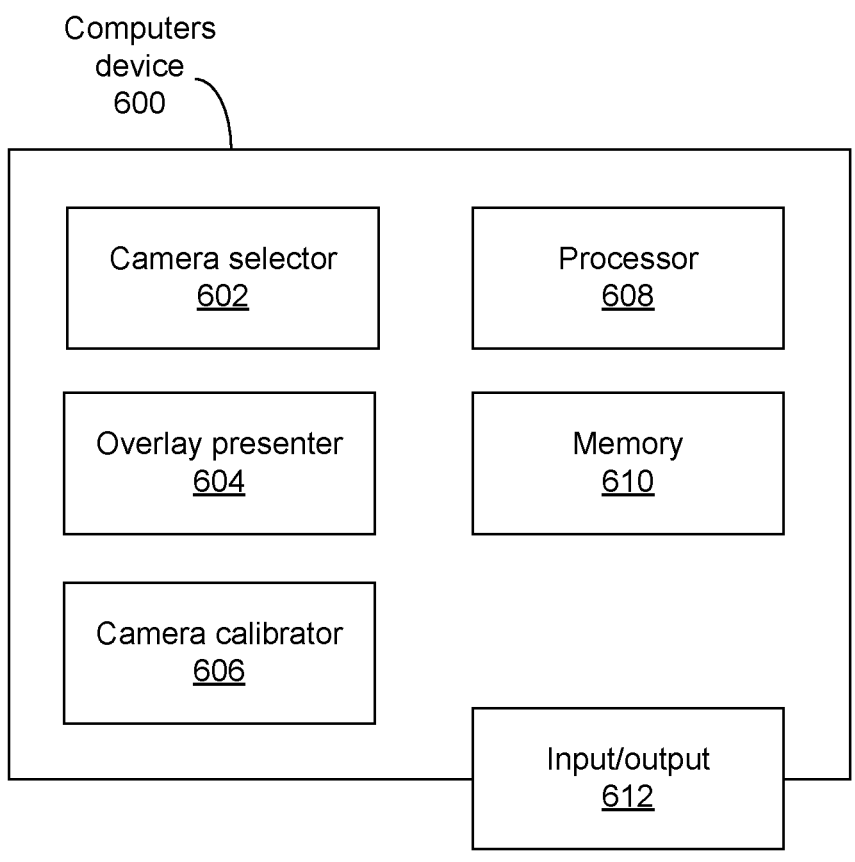
FIG. 6 is a block diagram showing a computing device for calibrating cameras.

FIG. 6 is a block diagram showing a computing device 600 for calibrating cameras. The methods, functions, and/or techniques described with respect to the computing device 600 can be performed by a local computing device such as the computing device 106 that is proximal to the display 102 by a server in communication with the display 102, cameras 104A, 104B, 104C, 104D, 104E, 104F, and/or computing device 106, and/or be distributed between multiple computing devices.

The computing device 600 can include a camera selector 602. The camera selector 602 can select a camera as a presentation camera. The camera selector 602 can select a camera as a presentation camera based, for example, on a predetermined portion of the overlay and/or calibration position being within a field of view of the camera, based on a distance of a predetermined portion of the overlay and/or calibration position from a center of the field of view, based on a number of corners of the overlay and/or calibration position included in the field of view of the camera, based on an angle between a plane extending through the overlay and/or calibration position and a line between the camera and the overlay and/or calibration position, based on a distance between the camera (or the display) and the overlay and/or calibration position, or based on the camera having been previously selected to present the feed.

The computing device 600 can include an overlay presenter 604. The overlay presenter 604 can cause the display 102 to present an overlay, as discussed above, along with the feed of the selected presentation camera, to guide the user 110 in orienting the calibration object 112.

The computing device 600 can include a camera calibrator 606. The camera calibrator 606 can calibrate the cameras 104A, 104B, 104C, 104D, 104E, 104F based on the images captured by the cameras 104A, 104B, 104C, 104D, 104E, 104F while the calibration object 112 is in the predetermined positions.

The computing device 600 can include at least one processor 608. The at least one processor 608 can execute instructions, such as instructions stored in at least one memory device 610, to cause the computing device 600 to perform any combination of methods, functions, and/or techniques described herein.

The computing device 600 can include at least one memory device 610. The at least one memory device 610 can include a non-transitory computer-readable storage medium. The at least one memory device 610 can store data and instructions thereon that, when executed by at least one processor, such as the processor 608, are configured to cause the computing device 600 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the computing device 600 can be configured to perform, alone, or in combination with the computing device 600, any combination of methods, functions, and/or techniques described herein. The at least one memory device 61 can include the predetermined positions of the calibration object 112.

The computing device 600 may include at least one input/output node 612. The at least one input/output node 612 may receive and/or send data, such as from and/or to, a server, and/or may receive input and provide output from and to a user. The input and output functions may be combined into a single node, or may be divided into separate input and output nodes. The input/output node 612 can include a microphone, multiple cameras (such as the cameras 104A, 104B, 104C, 104D, 104E, 104F), a display such as the display 102, a speaker, one or more buttons, and/or one or more wired or wireless interfaces for communicating with other computing devices.

Figure 7:
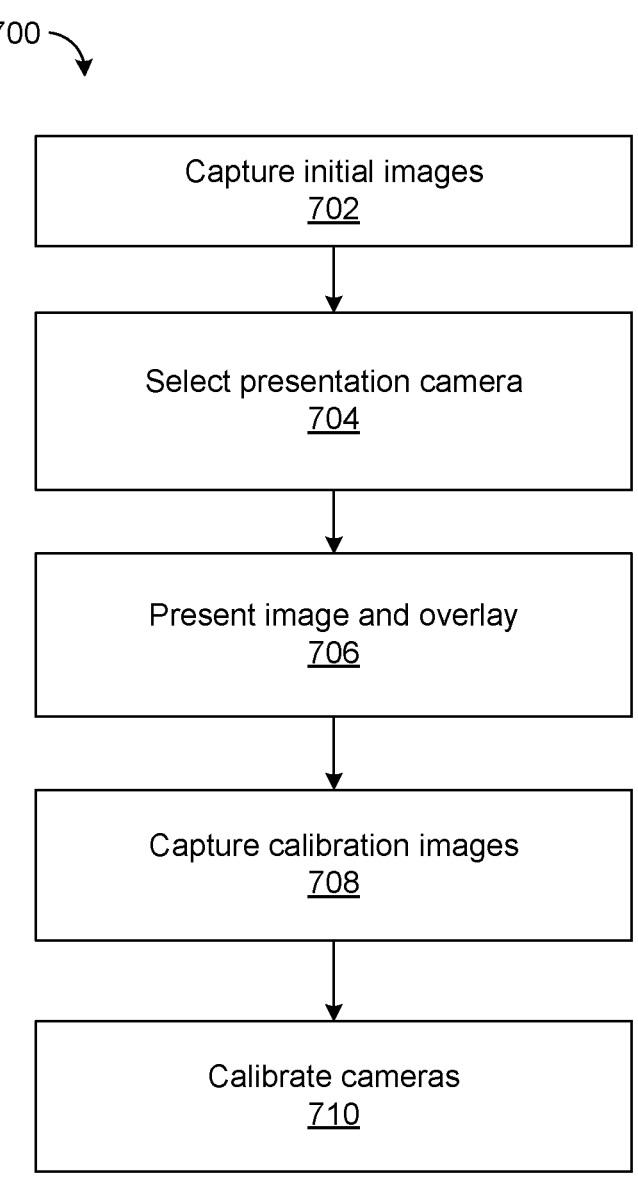
FIG. 7 is a flowchart showing a method performed by the computing device of FIG. 6.

FIG. 7 is a flowchart showing a method 700 performed by the computing device of FIG. 6. The method 700 can be a method of calibrating multiple cameras. The method 700 includes determining positions of overlays within fields of view (702). Determining positions of overlays within fields of view (702) can include determining a first position of an overlay within a first field of view of a first camera and a second position of the overlay within a second field of view of a second camera. The method 700 includes selecting a presentation camera (704). Selecting the presentation camera (704) can include selecting, from the first camera and the second camera based on the first position and the second position, the first camera as a presentation camera (704). The method 700 includes presenting an image and overlay (706). Presenting the image and overlay (706) can include presenting, on a display, an image of a calibration object captured by the presentation camera and the overlay, the overlay indicating a calibration position for the calibration object with respect to the presentation camera. The method 700 includes capturing calibration images (708). Capturing calibration images (708) can include capturing a first calibration image of the calibration object by the first camera and a second calibration image of the calibration object by the second camera. The method includes calibrating cameras (710). Calibrating cameras (710) can include calibrating the first camera based on the first calibration image and calibrating the second camera based on the second calibration image.

In some examples, the selecting the first camera includes selecting the first camera as the presentation camera based on a predetermined portion of the overlay being within the first field of view.

In some examples, the selecting the first camera includes selecting the first camera as the presentation camera based on the overlay being closer to a center of the first field of view than the overlay is to a center of the second field of view.

In some examples, the selecting the first camera includes selecting the first camera as the presentation camera based on a number of corners of the overlay included in the first field of view being greater than a number of corners of the overlay included in the second field of view.

In some examples, the selecting the first camera includes selecting the first camera as the presentation camera based on an angle between a plane extending through the overlay and a line between the first camera and the overlay being closer to perpendicular than an angle between the plane extending through the overlay and a line between the second camera and the overlay.

In some examples, the selecting the first camera includes selecting the first camera as the presentation camera based on a distance between the first camera and the overlay being greater than a distance between the second camera and the overlay.

In some examples, the selecting the first camera includes selecting the first camera as the presentation camera based on the first camera having been previously selected as the presentation camera.

In some examples, the first camera is coupled to the display and the second camera is coupled to the display.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method of calibrating multiple cameras performed by a computing device, the method comprising:
   determining a first position of an overlay within a first field of view of a first camera and a second position of the overlay within a second field of view of a second camera, the overlay indicating a calibration position for a calibration object, the first camera and the second camera being included in the computing device;
   selecting, from the first camera and the second camera based on the first position and the second position, the first camera as a presentation camera;
   presenting, on a display included in the computing device, an image of a calibration object captured by the presentation camera and the overlay, the overlay indicating a calibration position to guide a user in placing the calibration object with respect to the presentation camera;
   capturing a first calibration image of the calibration object by the first camera and a second calibration image of the calibration object by the second camera; and
   calibrating the first camera based on the first calibration image and calibrating the second camera based on the second calibration image.

2. The method of claim 1, wherein the selecting the first camera includes selecting the first camera as the presentation camera based on a predetermined portion of the overlay being within the first field of view.

3. The method of claim 1, wherein the selecting the first camera includes selecting the first camera as the presentation camera based on the overlay being closer to a center of the first field of view than the overlay is to a center of the second field of view.

4. The method of claim 1, wherein the selecting the first camera includes selecting the first camera as the presentation camera based on a number of corners of the overlay included in the first field of view being greater than a number of corners of the overlay included in the second field of view.

5. The method of claim 1, wherein the selecting the first camera includes selecting the first camera as the presentation camera based on an angle between a plane extending through the overlay and a line between the first camera and the overlay being closer to perpendicular than an angle between the plane extending through the overlay and a line between the second camera and the overlay.

6. The method of claim 1, wherein the selecting the first camera includes selecting the first camera as the presentation camera based on a distance between the first camera and the overlay being greater than a distance between the second camera and the overlay.

7. The method of claim 1, wherein the selecting the first camera includes selecting the first camera as the presentation camera based on the first camera having been previously selected as the presentation camera.

8. The method of claim 1, wherein the first camera is coupled to the display and the second camera is coupled to the display.

9. A non-transitory computer-readable storage medium comprising instructions stored thereon for calibrating multiple cameras, the instructions, when executed by at least one processor, being configured to cause a computing device to:
   determine a first position of an overlay within a first field of view of a first camera and a second position of the overlay within a second field of view of a second camera, the overlay indicating a calibration position for a calibration object, the first camera and the second camera being included in the computing device;
   select, from the first camera and the second camera based on the first position and the second position, the first camera as a presentation camera;
   present, on a display, an image of the calibration object captured by the presentation camera and the overlay, the overlay indicating the calibration position to guide a user in placing the calibration object with respect to the presentation camera;
   capture a first calibration image of the calibration object by the first camera and a second calibration image of the calibration object by the second camera; and
   calibrate the first camera based on the first calibration image and calibrate the second camera based on the second calibration image.

10. The non-transitory computer-readable storage medium of claim 9, wherein the selecting the first camera includes selecting the first camera as the presentation camera based on a predetermined portion of the overlay being within the first field of view.

11. The non-transitory computer-readable storage medium of claim 9, wherein the selecting the first camera includes selecting the first camera as the presentation camera based on a predetermined portion of the overlay being closer to a center of the first field of view than the predetermined portion of the overlay is to a center of the second field of view.

12. The non-transitory computer-readable storage medium of claim 9, wherein the selecting the first camera includes selecting the first camera as the presentation camera based on a number of corners of the overlay included in the first field of view being greater than a number of corners of the overlay included in the second field of view.

13. The non-transitory computer-readable storage medium of claim 9, wherein the selecting the first camera includes selecting the first camera as the presentation camera based on an angle between a plane extending through the overlay and a line between the first camera and the overlay being closer to perpendicular than an angle between the plane extending through the overlay and a line between the second camera and the overlay.

14. The non-transitory computer-readable storage medium of claim 9, wherein the selecting the first camera includes selecting the first camera as the presentation camera based on a distance between the first camera and the overlay being greater than a distance between the second camera and the overlay.

15. The non-transitory computer-readable storage medium of claim 9, wherein the selecting the first camera includes selecting the first camera as the presentation camera based on the first camera having been previously selected as the presentation camera.

16. The non-transitory computer-readable storage medium of claim 9, wherein the first camera is coupled to the display and the second camera is coupled to the display.

17. A computing device comprising:

at least one processor; and a non-transitory computer-readable storage device comprising instructions stored thereon for calibrating multiple cameras, the instructions, when executed by the at least one processor, being configured to cause the computing device to:

determine a first position of an overlay within a first field of view of a first camera and a second position of the overlay within a second field of view of a second camera, the overlay indicating a calibration position for a calibration object, the first camera and the second camera being included in the computing device;

select, from the first camera and the second camera based on the first position and the second position, the first camera as a presentation camera;

present, on a display, an image of a calibration object captured by the presentation camera and the overlay, the overlay indicating the calibration position to guide a user in placing the calibration object with respect to the presentation camera;

capture a first calibration image of the calibration object by the first camera and a second calibration image of the calibration object by the second camera; and calibrate the first camera based on the first calibration image and calibrate the second camera based on the second calibration image.

18. The computing device of claim 17, wherein the selecting the first camera includes selecting the first camera as the presentation camera based on a predetermined portion of the overlay being within the first field of view.

19. The computing device of claim 17, wherein the selecting the first camera includes selecting the first camera as the presentation camera based on a predetermined portion of the overlay being closer to a center of the first field of view than the predetermined portion of the overlay is to a center of the second field of view.

20. The computing device of claim 17, wherein the selecting the first camera includes selecting the first camera as the presentation camera based on a number of corners of the overlay included in the first field of view being greater than a number of corners of the overlay included in the second field of view.

* * * * *